(12) United States Patent
Coronado

(10) Patent No.: US 6,354,637 B1
(45) Date of Patent: Mar. 12, 2002

(54) ADAPTER FOR CONNECTOR AND VALVES

(75) Inventor: Eduardo Q. Coronado, Garza Garcia (MX)

(73) Assignee: Coflex S.A. de C.V., Monterrey (MX)

( * ) Notice: Subject to any disclaimer, the term of this patent is extended or adjusted under 35 U.S.C. 154(b) by 0 days.

(21) Appl. No.: 09/533,312

(22) Filed: Mar. 22, 2000

(51) Int. Cl.⁷ .............................................. F16L 17/00
(52) U.S. Cl. ...................................... 285/357; 285/333
(58) Field of Search ................................ 285/357, 356, 285/353, 393, 148.23, 148.18, 333, 12; 411/178

(56) References Cited

U.S. PATENT DOCUMENTS

| | | | | |
|---|---|---|---|---|
| 1,707,087 A | * | 3/1929 | Little ..................... | 285/357 X |
| 2,172,532 A | * | 9/1939 | Fentress ................. | 285/357 X |
| 2,456,418 A | * | 12/1948 | Imerman ................ | 285/393 X |
| 2,546,348 A | * | 3/1951 | Schuman ................ | 285/356 X |
| 4,798,404 A | * | 1/1989 | Iyanicki .................. | 285/357 X |
| 5,542,718 A | * | 8/1996 | Gronwick et al. .......... | 285/357 |

* cited by examiner

Primary Examiner—Teri Pham Luu
(74) Attorney, Agent, or Firm—John G. Flaim; William D. McSpadden; Baker & McKenzie

(57) ABSTRACT

An adapter and associated apparatus for transferring gas/fluid are presented herein. The adapter is configured to connect valves and connectors of plural sizes to each other. The adapter includes an outer surface having an outer thread for connection to a tightening nut of the connector. The adapter also includes a first and second inner surfaces sized for different size valves.

10 Claims, 5 Drawing Sheets

ADAPTER FOR CONNECTOR AND VALVES

FIELD

The present application for patent relates to fluid and gas transfer equipment, and more particularly to adapters for connecting connectors to gas or fluid valves.

BACKGROUND

Gas and fluid transfer systems typically include valves and any number of connectors. The valves receive the gas or fluid from a sources and can either permit or block the flow of the gas or fluid to a destination. Where the valve permits the flow of gas/fluid, the gas/fluid is received by the connector.

The connector and the valve connection is air tight, thereby preventing the release of gas/fluid. The air tight connection is achieved by threadably connecting the opening of the valve with one end of the connector. To make a threadable connection, the connector and valve must be appropriately sized for each other.

Valves and connectors are usually manufactured, distributed, and sold separately from each other and in a variety of different sizes. Accordingly, combinations of valves and connectors of different sizes are incompatible. An adapter is used to establish a connection between valves and connectors of differing sizes.

An adapter includes a first portion which is sized for and threadably receives the valve and a second portion which is sized for and threadably receives the connector. However, to connect a particular valve to a particular connector, the adapter must appropriately sized for both. As the variety of sizes of valves and connectors grows linearly (n), the number of types of adapters needed grows on an n^2 basis. As the number of differently sized adapters grows, stocking and inventory problems arise as sellers must keep appropriate stock of each sized adapter.

Accordingly, it would be advantageous if the number of adapters required to match each of a set of valves to each of a set of connectors could be reduced.

SUMMARY

The present invention is directed to an adapter capable of connecting plural sizes of valves to a connector. The adapter has an outer surface with a thread thereon for connection to the connector. The adapter also has a distal inner surface with a thread thereon to accept a first sized valve, and a proximate inner surface with a thread thereon to accept a valve of a second size.

DETAILED DESCRIPTION OF PREFERRED EMBODIMENTS

Figures 1A, 1B:
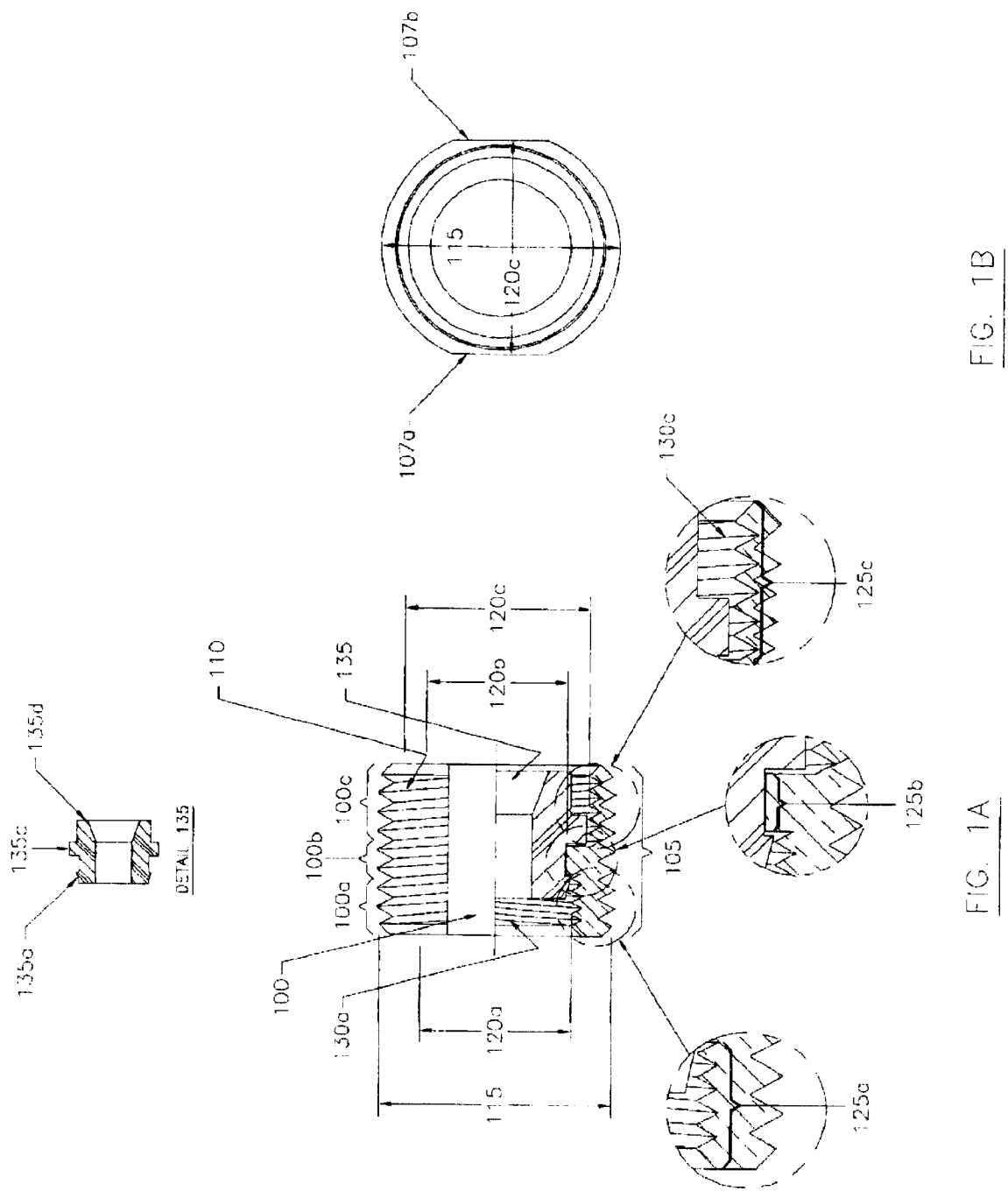
FIG. 1A a diagram of an adapter in accordance with the teachings of the present invention.
FIG. 1B is a diagram of an overhead view of the adapter illustrated FIG. 1A.

Referring now to FIG. 1A, there is illustrated a diagram of an adapter in accordance with the teachings and principals of the present invention. The adapter includes a hollow substantially cylindrical member 100 made of, for example, plastic or a non-ferrous metal, such as brass. The cylindrical member 100 includes an outer surface 105 with an outwardly extending thread 110. The outer surface 105 is capable of receiving an appropriately sized connector by mating the thread 110 on the outer surface 105 with a thread on an inner surface of the connector.

Referring now to FIG. 1B, there is illustrated an overhead view of the adapter illustrated in FIG. 1A. The outer surface 105 can also include flat surfaces 107a, 107b to facilitate tightening or removing the adapter from the valve/connecting with a wrench or pliers.

The cylindrical member 100 includes a first portion 100a, a second portion 100b, and a third portion 100c. The first portion 100a is hollow and substantially cylindrical with an outer diameter 115, a first diameter 120a, and a first inner surface 125a. The second portion 100b is hollow and substantially cylindrical with outer diameter 115, a second diameter 120b, and a second inner surface 125b. The third portion 100c is hollow and substantially cylindrical with outer diameter 115, a proximate diameter 120c, and third inner surface 125c. The first diameter 120a is smaller than the third diameter 120c.

The first portion 100a includes a first thread 130a about the first inner surface 125a and having a diameter equal to the first diameter 120a. The third portion 100c includes a second thread 130c about the third inner surface 125c and having a diameter equal to the third diameter 120c. The first portion 100a, and third portion 100c are each capable of receiving an appropriately sized valve by mating the first thread 130a or second thread 130c with a thread on an outer surface of the valve or connector.

The adapter includes a seal 135 to facilitate an air tight connection between the adapter and valve received at either the first portion 100a or third portion 100c. The seal 135 can be made of a flexible material such as thermoplastic rubber, nitrile rubber, or etylene-propylene-compound diene rubber. The seal 135 is also hollow and substantially cylindrical with an outwardly skirt 135a, an outwardly extending step 135c, and an inverse skirt 135d. The seal 135 has a diameter selected to be similar to the second diameter 120b, while the skirt 135a has a maximum diameter selected to be similar to the first diameter 120a, and the step 135c has a diameter selected to be similar to the third diameter 120c.

The seal 135 is disposed inside the cylindrical member 100, such that the step 135c is surrounded by the third portion 100c and the skirt 135a is surrounded by the first portion 100a. The step 135c and the base of the skirt 135a preferably rest against opposite sides of the second region 100b. When a valve is received by the third portion 100c, the step 135a is pressed against the side of the second portion 100b, thereby forming an air tight seal.

Figure 2A:
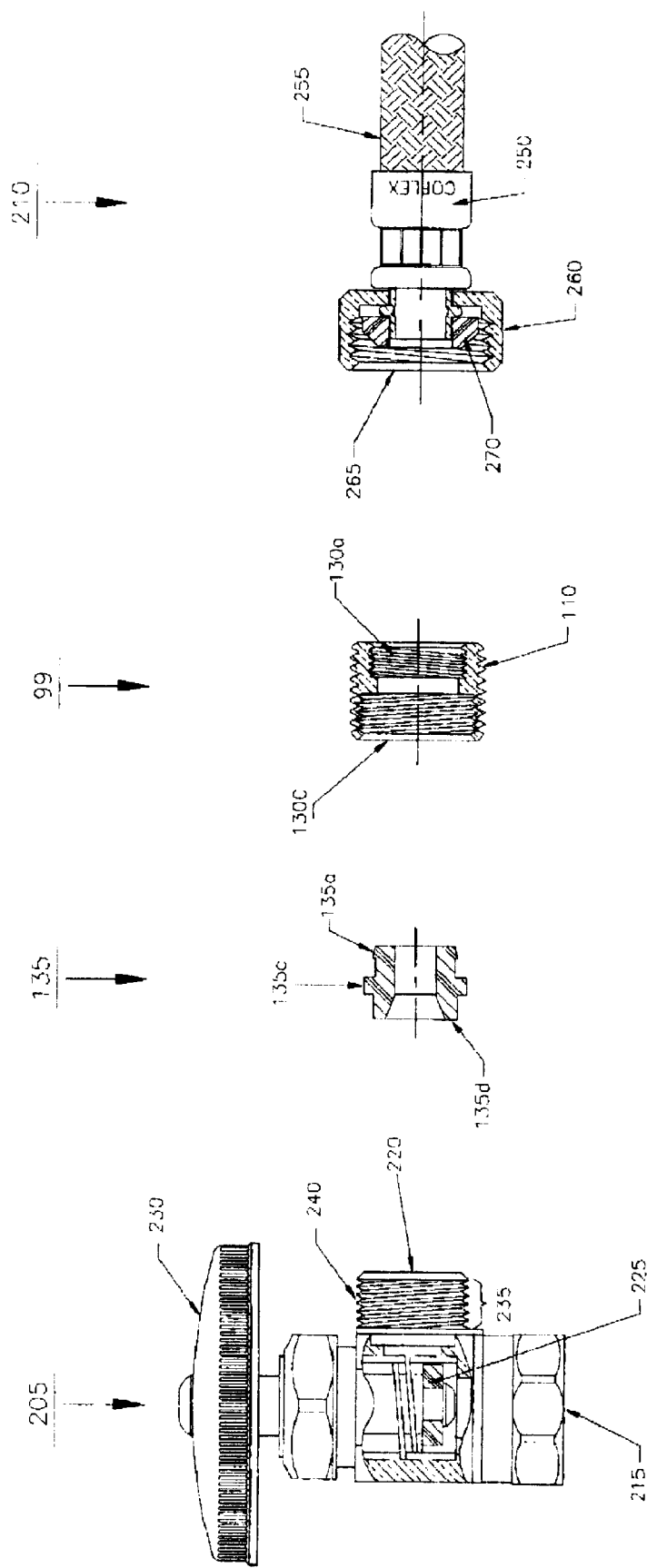
FIG. 2A is an illustration of a valve, seal, adapter, and a connector, connectable to form a first embodiment of the present invention.
Figure 2B:
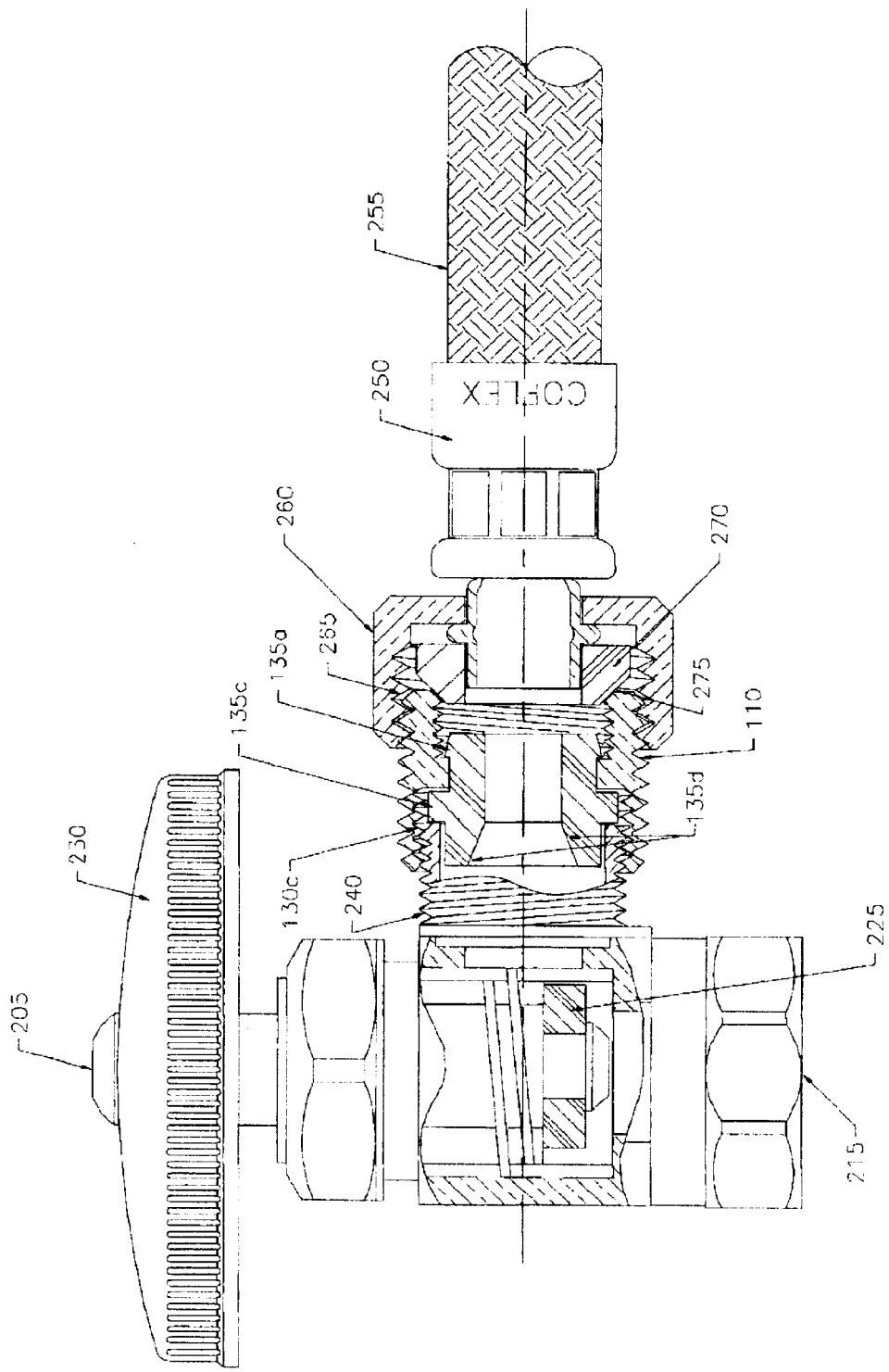
FIG. 2B an illustration of a gas/fluid transport apparatus in accordance with a first embodiment of the present invention.

Referring now to FIG. 2, there is illustrated a block diagram of a gas/fluid transport apparatus configured in accordance with a first embodiment of the present invention. FIG. 2A illustrates a valve 205, a seal 135, an adapter 99, and a connector 210. FIG. 2B illustrates the gas/fluid transport apparatus formed by connecting the valve 205, seal 135, adapter 99, and the connector 210 in accordance with the teachings of the present invention.

The valve 205 receives gas/fluid transports through a first opening 215 and transports the gas/fluid through a second opening 220. The transport of the gas/fluid is controlled by a gate 225 which either blocks or permits the flow of the gas/fluid by opening or closing a passage from the first opening 215 to the second opening 220. The passage is opened or closed by rotating a faucet head 230.

The second opening 220 is surrounded by a substantially cylindrical region 235 which includes a thread thereon 240. The cylindrical region 235, depending on size, is connectable to the third inner surface 125c by meting the thread 240 on the cylindrical region 235 with the second thread 130c. Connection of the cylindrical region 235 of the valve 205 to the third inner surface causes the step 135c of the seal 135 to be pressed onto one side of the second region 100b, while the skirt 135a is pressed into the first region 100a.

The connector 210 receives the gas/fluid through an opening 250 in a tube 255 and transports the gas/fluid to a destination, through the tube 255. The tube 255 is attached to a tightening nut 260 with an internal thread 265. The tightening nut 260 is connectable to the outer surface 105 by meting the thread 110 on the outer surface to the internal thread 265.

The tightening nut 260 includes therein a connector seal 270. The connector seal 270 includes a ramp 275 with a rising edge facing the hose 255. The connector seal 270 is sized such that the smallest diameter of the ramp 275 is smaller than the first diameter 120a and largest diameter of the ramp is larger than the third diameter 120c. When the tightening nut 260 is connected to the outer surface 105, the ramp 275 is passed into and against the first region 100a, thereby forming an airtight seal.

Figure 3A:
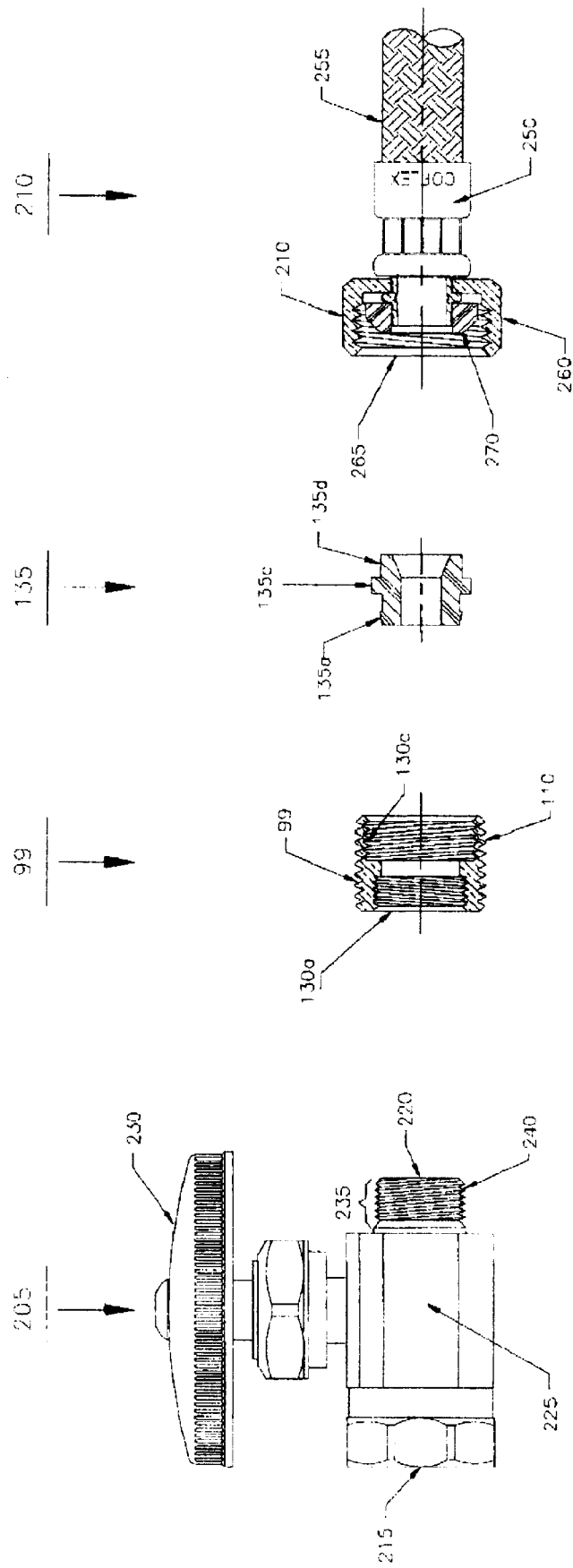
FIG. 3A is an illustration of a valve, seal, adapter, and a connector, connectable to form a second embodiment of the present invention.
Figure 3B:
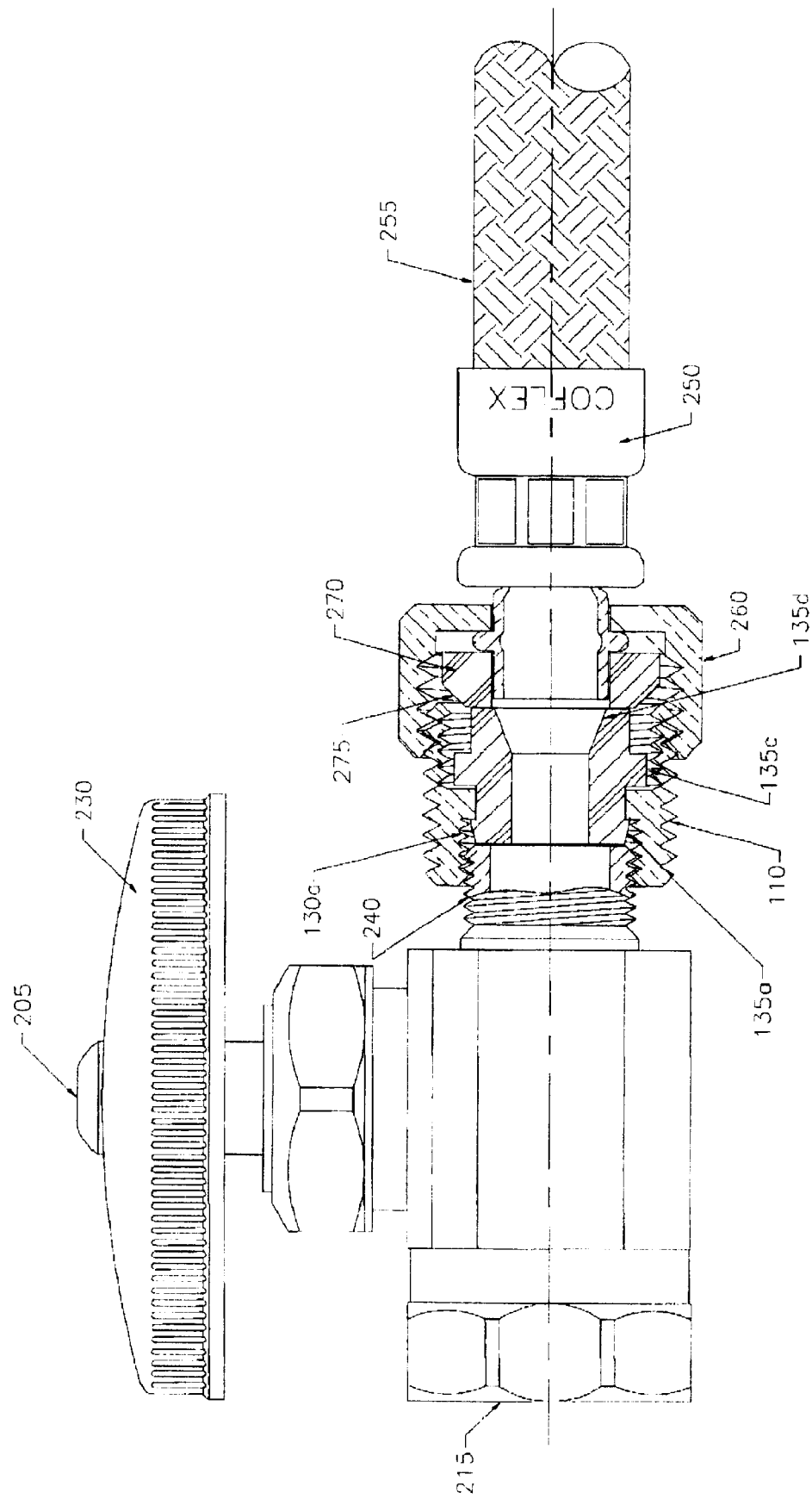
FIG. 3B is an illustration of a gas/fluid transport apparatus in accordance with a second embodiment of the present invention.

Referring now to FIG. 3, there is illustrated a block diagram of a gas/fluid transport apparatus configured in accordance with a second embodiment of the present invention. FIG. 3A illustrates a valve 205, a seal 135, an adapter 99, and a connector 210. FIG. 3B illustrates the gas/fluid transport apparatus formed by connecting the valve 205, seal 135, adapter 99, and the connector 210 in accordance with the teachings of the present invention.

The substantially cylindrical region 235, depending on size, is connectable to the first inner surface 125a by meting the thread 240 on the cylindrical region 235 with the first thread 130a. The tightening nut 260 is connectable to the outer surface 105 by meting the thread 110 on the outer surface to the internal thread 265. Connection of the tightening nut 260 to the outer surface 105 causes the connector seal 270 to be pressed into and against the third region 100c. Additionally, the falling edge of the ramp 275 is received by the inverse skirt 135d causing the seal 135 to be pressed against the edge of the cylindrical region 235, thereby forming an airtight seal.

Although preferred embodiments of the present inventions have illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof.

What is claimed is:

1. An adapter comprising:

a substantially cylindrical hollow member having an outer surface, a distal inner surface, a proximate inner surface, a distal inner diameter, and a proximate inner diameter;

an outer thread about the outside surface;

a distal thread about the distal inner surface, the distal thread having a distal thread diameter substantially equivalent to the distal inner diameter;

a proximate thread about the proximate inner surface, the proximate thread having a proximate thread diameter substantially equivalent to the proximate inner diameter; and a flat surface extending along the outer surface of the substantially cylindrical hollow member and interrupting the outside thread.

2. The adapter of claim 1, wherein the substantially cylindrical hollow member comprises plastic.

3. The adapter of claim 1, wherein the substantially cylindrical hollow member comprises a non-ferrous metal.

4. The adapter of claim 1, wherein the substantially hollow member comprises brass.

5. The adapter of claim 1, further comprising:

a seal disposed inside the substantially cylindrical hollow member.

6. The adapter of claim 5, wherein the seal comprises:

a substantially cylindrical hollow portion;

an outwardly extending step on the substantially cylindrical hollow portion; and an outwardly extending skirt on the substantially cylindrical hollow portion.

7. The adapter of claim 6, wherein the seal further comprises:

the outwardly extending step is surrounded by the proximate inner surface; and the outwardly extending skirt is surrounded by the distal inner surface.

8. The adapter of claim 5, wherein the seal comprises rubber.

9. The adapter of claim 5, wherein the seal comprises a material selected from a group consisting of:

thermoplastic rubber;

nitrile rubber; and etylene-propylene-compound diene rubber.

10. The adapter of claim 1, wherein the proximate inner diameter is larger than the distal inner diameter.

* * * * *

UNITED STATES PATENT AND TRADEMARK OFFICE
CERTIFICATE OF CORRECTION

PATENT NO. : 6,354,637
DATED : March 12, 2002
INVENTOR(S) : Coronado

Page 1 of 1

It is certified that error appears in the above-identified patent and that said Letters Patent is hereby corrected as shown below:

Title page,
Title, delete the word "CONNECTOR" and insert in lieu thereof the word
-- CONNECTORS --;

Column 1,
Line 1, Title, delete the word "CONNECTOR" and insert in lieu thereof the word
-- CONNECTORS --; and
Line 11, delete the words "sources" and insert in lieu thereof the word -- source --.

Signed and Sealed this

Twenty-first Day of May, 2002

Attest:

JAMES E. ROGAN
Attesting Officer
Director of the United States Patent and Trademark Office